R. W. KUMLER.
AUTOMOBILE LOCK.
APPLICATION FILED DEC. 26, 1914. RENEWED JUNE 19, 1918.

1,292,486.

Patented Jan. 28, 1919.

Witnesses
Chas. W. Stauffiger
Anna M. Dow

Inventor
Roy W. Kumler.
By
Attorney

UNITED STATES PATENT OFFICE.

ROY W. KUMLER, OF DETROIT, MICHIGAN.

AUTOMOBILE-LOCK.

1,292,486.   Specification of Letters Patent.   Patented Jan. 28, 1919.

Application filed December 26, 1914, Serial No. 878,924. Renewed June 19, 1918. Serial No. 240,862.

*To all whom it may concern:*

Be it known that I, ROY W. KUMLER, a citizen of the United States of America, residing at Detroit, in the county of Wayne and State of Michigan, have invented certain new and useful Improvements in Automobile-Locks, of which the following is a specification, reference being had therein to the accompanying drawings.

This invention relates to a safety lock for automobiles or the like whereby the latter may be secured in such a manner as to permit their limited movement while at the same time no one can successfully drive a car that is thus locked any distance under its own power.

The invention consists in the matters hereinafter set forth, and more particularly pointed out in the appended claims.

Figure 1:
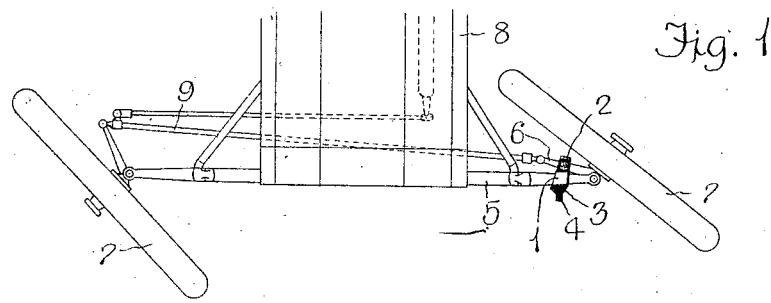
Figure 1 is a plan view of the forward portion of an automobile chassis equipped with a safety lock that embodies features of the invention.
Figure 3:
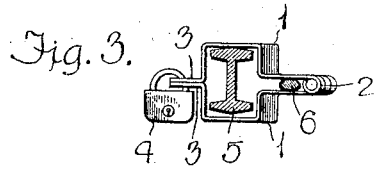
Fig. 3 is a view in detail and in section showing the applied lock.
Figure 2:
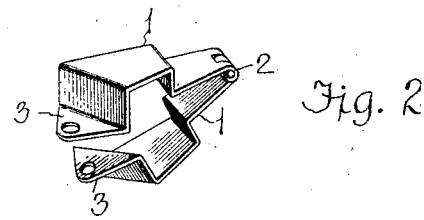
Fig. 2 is a view in perspective of a lock member.
Figure 5:
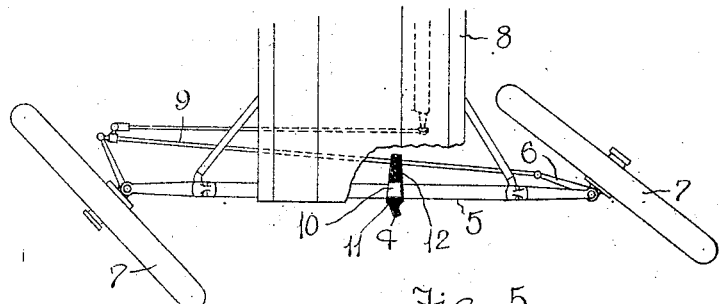
Fig. 5 is a view in detail showing another application of the lock.

Referring to the drawings and to one form which the device may have, a locking member is formed of a pair of oppositely disposed arms 1 that are pivoted or hinged together at one end by any preferred type of hinge joint 2 and are provided at the other end with apertured ears 3 whereby the member as a whole, may, by the use of a padlock 4 embrace and hold inoperative any two members of a steering gear mechanism that move relatively to each other whenever the steering wheel gear is operated, as for example, a front axle 5 and spindle arm 6, as shown in Fig. 1, when the front guide wheels 7 are turned at an oblique angle to the main frame 8 as indicated. Or the arms may inclose the front axle 5 and the spindle connecting rod 9 as in Fig. 5.

Figure 4:
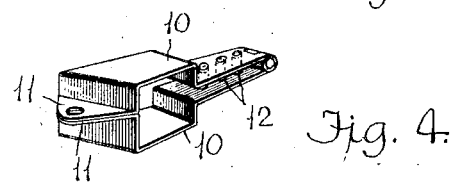
Fig. 4 is a view in detail of another form of lock member.

If it is desired to lock the wheels at a less angle, or in straight ahead position, this may be readily done by the form indicated in Fig. 4 wherein arms 10 that are pivotally connected or hinged together at one end and provided at the other with apertured ears 11 for a padlock, have spaced studs 12 connected to one or the other and arranged to pass through mating apertures in the companion arm whereby the lock may be readily applied to hold the parts in any one of several positions. It is evident also that the lock instead of being of the padlock type, may be permanently secured to one of the arms and arranged to engage with the mating arm.

As a result of these various constructions a steering lock is obtained that effectively prevents unauthorized removal or use of the vehicle while at the same time its limited movement is permissible.

Obviously, changes in the details of construction may be made without departing from the spirit of my invention and I do not care to limit myself to any particular form or arrangement of parts.

What I claim is:—

1. The combination with a front axle, spindle and spindle arms of an automobile, with a lock therefor including a pair of sheet metal members pivoted together at one end and bent between the ends in opposite directions to provide an offset portion adapted to conform to and closely embrace and hold the spindle arms and axle in fixed angular relation, the arms having spaced studs secured to one and arranged to pass through registering apertures in the companion arms, the other end portions of the members having mating apertures, and a lock insertible through the latter apertures.

2. The combination with a front axle, spindle and spindle arms of an automobile, with a lock including a pair of sheet metal members secured together at one end and offset between the ends in opposite directions to conform to and closely embrace and hold the spindle arms and axle in fixed angular relation, studs extending from one of the arms into mating apertures of the companion arm, the outer end portions of the members beyond the outlet being bent into parallel contiguous relation with mating apertures. and a lock insertible through the mating apertures for securing the parts in fixed relation.

In testimony whereof I affix my signature in presence of two witnesses.

ROY W. KUMLER.

Witnesses:
C. R. STICKNEY,
ANNA M. DORR.